United States Patent
Kim et al.

(10) Patent No.: US 9,426,798 B2
(45) Date of Patent: Aug. 23, 2016

(54) METHOD FOR ESTIMATING DATA CHANNEL IN WIRELESS COMMUNICATION SYSTEM, AND APPARATUS FOR SAME

(75) Inventors: Kitae Kim, Anyang-si (KR); Jinyoung Chun, Anyang-si (KR); Hyunsoo Ko, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 14/362,362

(22) PCT Filed: Aug. 23, 2012

(86) PCT No.: PCT/KR2012/006709
§ 371 (c)(1),
(2), (4) Date: Jul. 21, 2014

(87) PCT Pub. No.: WO2013/085135
PCT Pub. Date: Jun. 13, 2013

(65) Prior Publication Data
US 2014/0369287 A1    Dec. 18, 2014

Related U.S. Application Data

(60) Provisional application No. 61/568,160, filed on Dec. 8, 2011.

(51) Int. Cl.
*H04W 4/00*      (2009.01)
*H04W 72/04*     (2009.01)
*H04L 25/02*     (2006.01)
*H04L 27/26*     (2006.01)

(52) U.S. Cl.
CPC ......... *H04W 72/042* (2013.01); *H04L 25/0202* (2013.01); *H04L 25/023* (2013.01); *H04L 25/0204* (2013.01); *H04L 27/2647* (2013.01)

(58) Field of Classification Search
None
See application file for complete search history.

(56) References Cited

U.S. PATENT DOCUMENTS 9,185,694 B2 * 11/2015 Seo et al.
2010/0232384 A1   9/2010 Farajidana et al.
(Continued)

FOREIGN PATENT DOCUMENTS

KR   10-2009-0085739 A   8/2009
KR   10-2009-0119582 A   11/2009
(Continued)

*Primary Examiner* — Steven H Nguyen
(74) *Attorney, Agent, or Firm* — Birch, Stewart, Kolasch & Birch, LLP

(57) ABSTRACT

The present invention relates to a method in which a UE estimates a downlink data channel in a wireless communication system, and an apparatus for the same. Specifically, disclosed is a method in which a UE estimates a downlink data channel in a wireless communication system, the method including the steps of: receiving a downlink control channel using a UE-specific reference signal; bundling a resource block for a downlink data channel into one channel estimation unit when a space resource for the downlink control channel and a space resource for the downlink data channel which makes commands in the downlink control channel are the same as each other; and performing a channel estimation on the basis of the UE-specific reference signal with respect to the one channel estimation unit.

14 Claims, 13 Drawing Sheets

(56) References Cited

U.S. PATENT DOCUMENTS

2011/0110444 A1    5/2011    Roh et al.
2011/0142142 A1    6/2011    Jwa et al.

FOREIGN PATENT DOCUMENTS

| | | |
|---|---|---|
| KR | 10-2011-0068790 A | 6/2011 |
| KR | 10-2011-0088297 A | 8/2011 |

* cited by examiner

FIG. 2
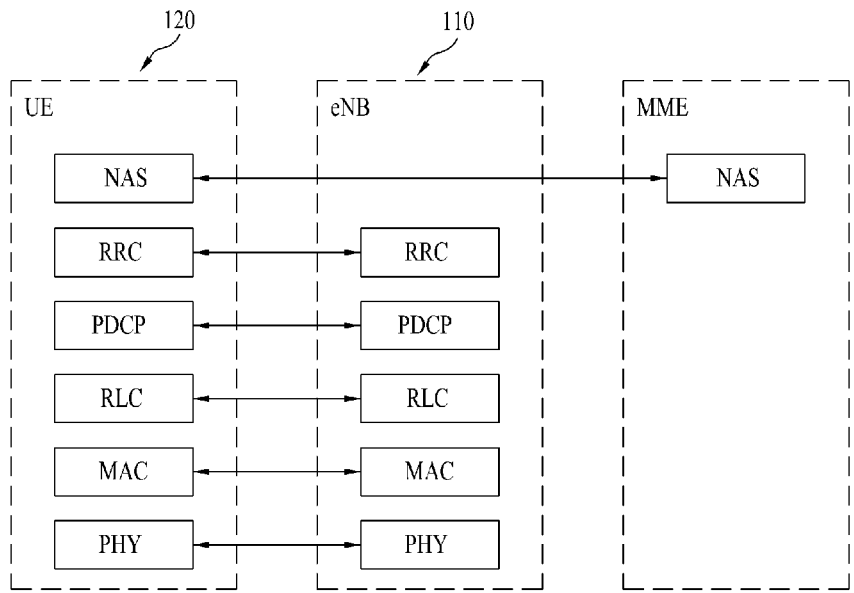
(a) Control-plane protocol stack
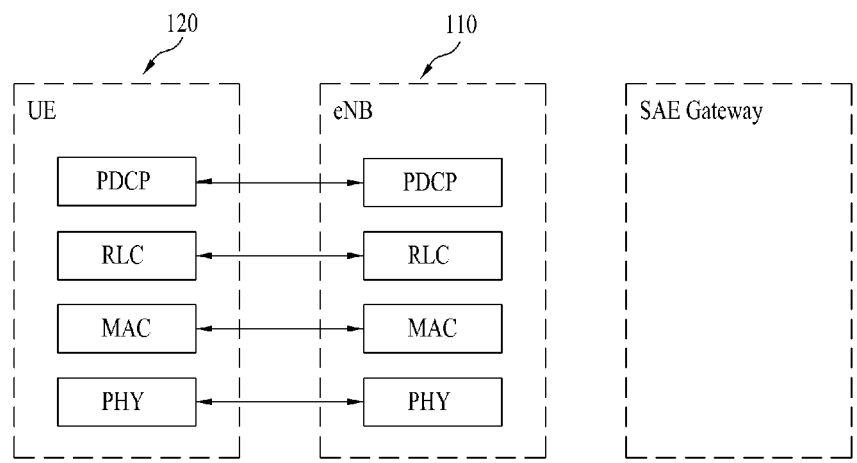
(b) User-plane protocol stack FIG. 6
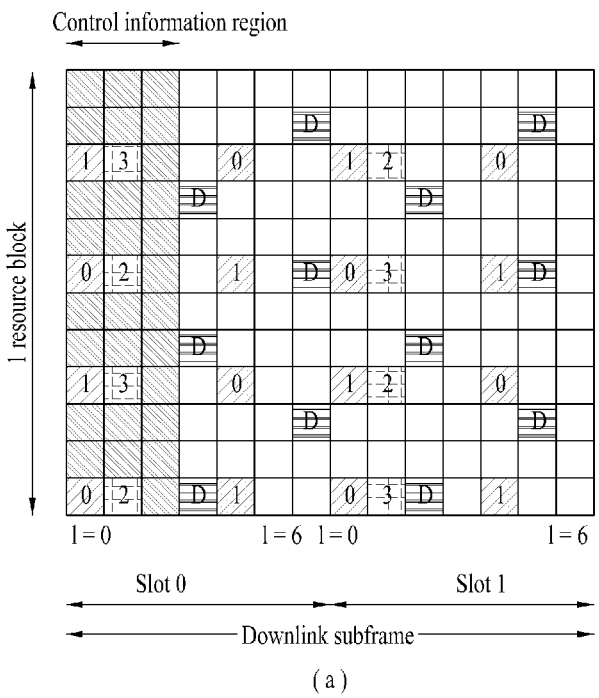
(a)
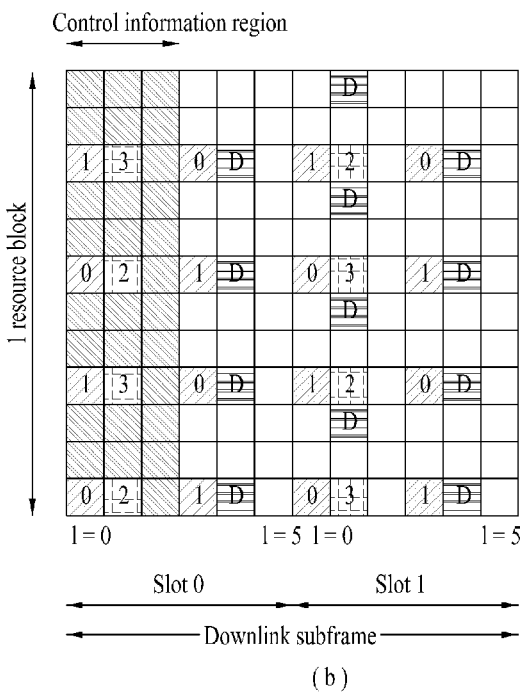
(b)

METHOD FOR ESTIMATING DATA CHANNEL IN WIRELESS COMMUNICATION SYSTEM, AND APPARATUS FOR SAME

CROSS REFERENCE TO RELATED APPLICATIONS

This application is the National Phase of PCT/KR2012/006709 filed on Aug. 23, 2012, which claims priority under 35 U.S.C. 119(e) to U.S. Provisional Application No. 61/568,160 filed on Dec. 8, 2011, all of which are hereby expressly incorporated by reference into the present application.

TECHNICAL FIELD

The present invention relates to a wireless communication system, and more particularly, to a method of estimating a data channel in a wireless communication system and apparatus therefor.

BACKGROUND ART

3GPP LTE ($3^{rd}$ generation partnership projecting long term evolution) communication system is schematically described as one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE), base stations (eNode B: eNB) and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. To this end, reduction of cost per bit, service availability increase, flexible frequency band use, simple-structure and open interface, reasonable power consumption of user equipment and the like are required.

DISCLOSURE OF THE INVENTION

Technical Tasks

Based on the above-mentioned discussion, a method of estimating a data channel in a wireless communication system and apparatus therefor shall be proposed in the following description.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of estimating a downlink data channel, which is estimated by a user equipment in a wireless communication system, according to one embodiment of the present invention preferably includes the steps of receiving a downlink control channel using a UE-specific reference signal, if a space resource for the downlink control channel is identical to a space resource for the downlink data channel indicated by the downlink control channel, bundling a resource block for the downlink data channel and a resource block for the downlink control channel with each other by a single channel estimation unit, and performing a channel estimation on the single channel estimation unit based on the UE-specific reference signal.

Preferably, the space resource is defined as at least one antenna port index for a specific user equipment and a layer number according to the antenna port. More preferably, if the space resources are identical to each other, an antenna port index for the downlink control channel and a layer number are defined as identical to those for the downlink data channel.

Preferably, the downlink control channel includes an indication field defining the space resource of the downlink data channel and the space resource of the downlink data channel may be determined in accordance with the definition of the indication field.

Preferably, the downlink control channel includes information on a transport block for the downlink data channel and the space resource of the downlink data channel may be defined in accordance with the information on the transport block. More preferably, if the information on the transport block includes information on a disabled transport block, the space resource for the downlink data channel is determined in accordance with an NDI (new data indicator) of the disabled transport block.

Preferably, the method may further include the steps of if the number of space resources for the downlink data channel is greater than that of space resources for the downlink control channel, coordinating a reception power of the downlink control channel into a reception power corresponding to each of the space resources of the downlink data channel and bundling the resource block for the downlink data channel and the resource block for the downlink control channel with each other by the single channel estimation unit.

Advantageous Effects

According to the present invention, a user equipment in a wireless communication can perform a channel estimation using both DM-RS for decoding of a control channel and DM-RS for decoding of a corresponding data transport channel simultaneously.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram of structures of control and user planes of a radio interface protocol between a user equipment and E-UTRAN based on 3GPP radio access network specification.

FIG. 6 is a diagram of a resource unit used to configure a downlink control channel in in LTE system.

BEST MODE FOR INVENTION

Figure 1:
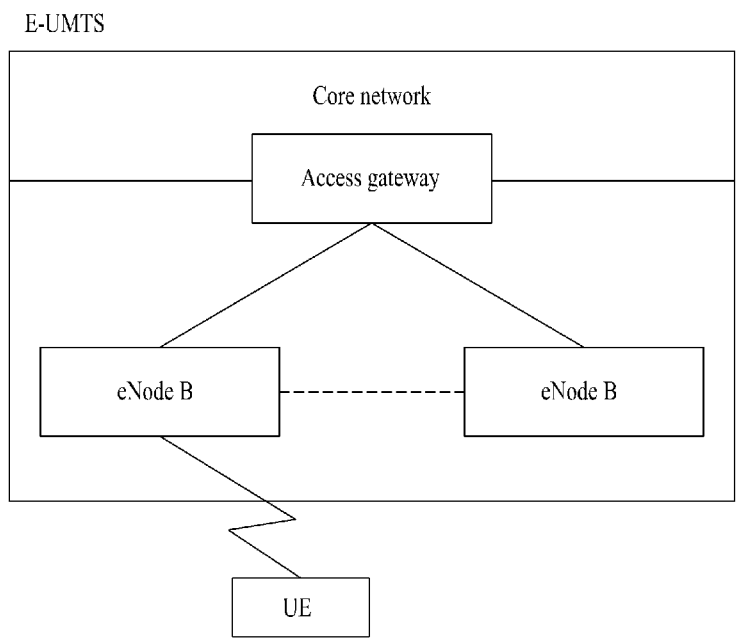
FIG. 1 is a diagram illustrating physical channels used in a 3GPP LTE system as one example of a wireless communication system and a general signal transmission method using the same.

The following technology is applicable to a variety of wireless access systems using CDMA (code division multiple access), FDMA (frequency division multiple access), TDMA (time division multiple access), OFDMA (orthogonal frequency division multiple access), SC-FDMA (single carrier frequency division multiple access) and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink and SC-FDMA in uplink. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

In a wireless communication system, a user equipment (UE) receives information from a base station on downlink (DL) and transmits information to the base station on uplink (UL). Data and various types of control information are transmitted and received between the base station and the user equipment (UE) and there are various physical channels according to the types/usages of the transmitted and received data and control information.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, interne packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
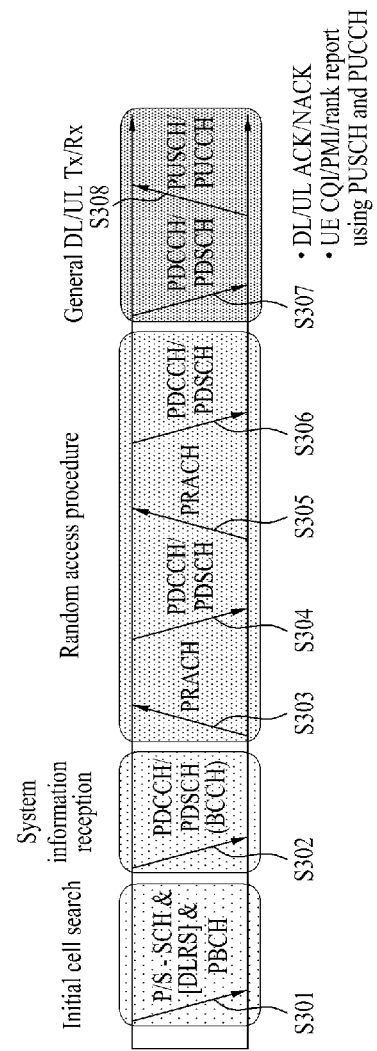
FIG. 3 is a diagram to describe physical channels used for 3GPP system and a general method of transmitting a signal using the same.

FIG. 3 is a diagram illustrating physical channels used in a 3GPP LTE system and a general signal transmission method using the same.

When a UE is powered on or enters a new cell, the UE performs initial cell search such as synchronization acquisition with a base station in step S301. To this end, the UE may receive a primary synchronization channel (P-SCH) and a secondary synchronization channel (S-SCH) from the base station, establish synchronization with the base station, and acquire information such as a cell identity (ID). Thereafter, the UE may receive a physical broadcast channel (PBCH) from the base station to acquire information broadcast in the cell. Meanwhile, the UE may receive a DL reference signal (RS) in the initial cell search step to confirm a downlink channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the base station. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PUCCH) signal (step S308) according to a general UL/DL signal transmission procedure. Control information that the UE transmits to the base station is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indication (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technology completes data by putting fragments received via several antennas together. If the MIMO technology is adopted, a data transmission rate within a cell area having a specific size may be improved or a system coverage may be increased by securing a specific data transmission rate. Moreover, this technology may be widely applicable to a mobile communication terminal, a relay and the like. According to the MIMO technology, it may be able to overcome the transmission size limit of the related art mobile communication which used to use a single data.

Figure 4:
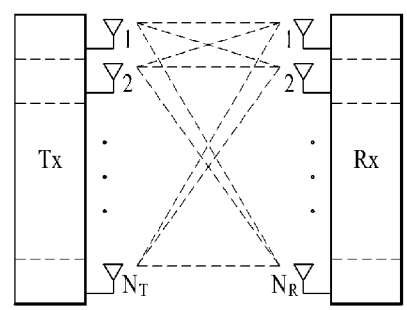
FIG. 4 is a diagram for a configuration of a general multi-antenna (MIMO) communication system.

FIG. 4 is a diagram for a configuration of a multi-antenna (MIMO) communication system explained in the description of the present invention. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 4, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \quad \text{[Formula 2]}$$

Meanwhile, transmission powers can be set different from each other for transmission informations $S_1, S_2, \ldots, S_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, Ŝ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector Ŝ. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \quad \text{[Formula 7]}$$

In this case, '# of streams' may indicate the number of stream(s). Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Figure 5:
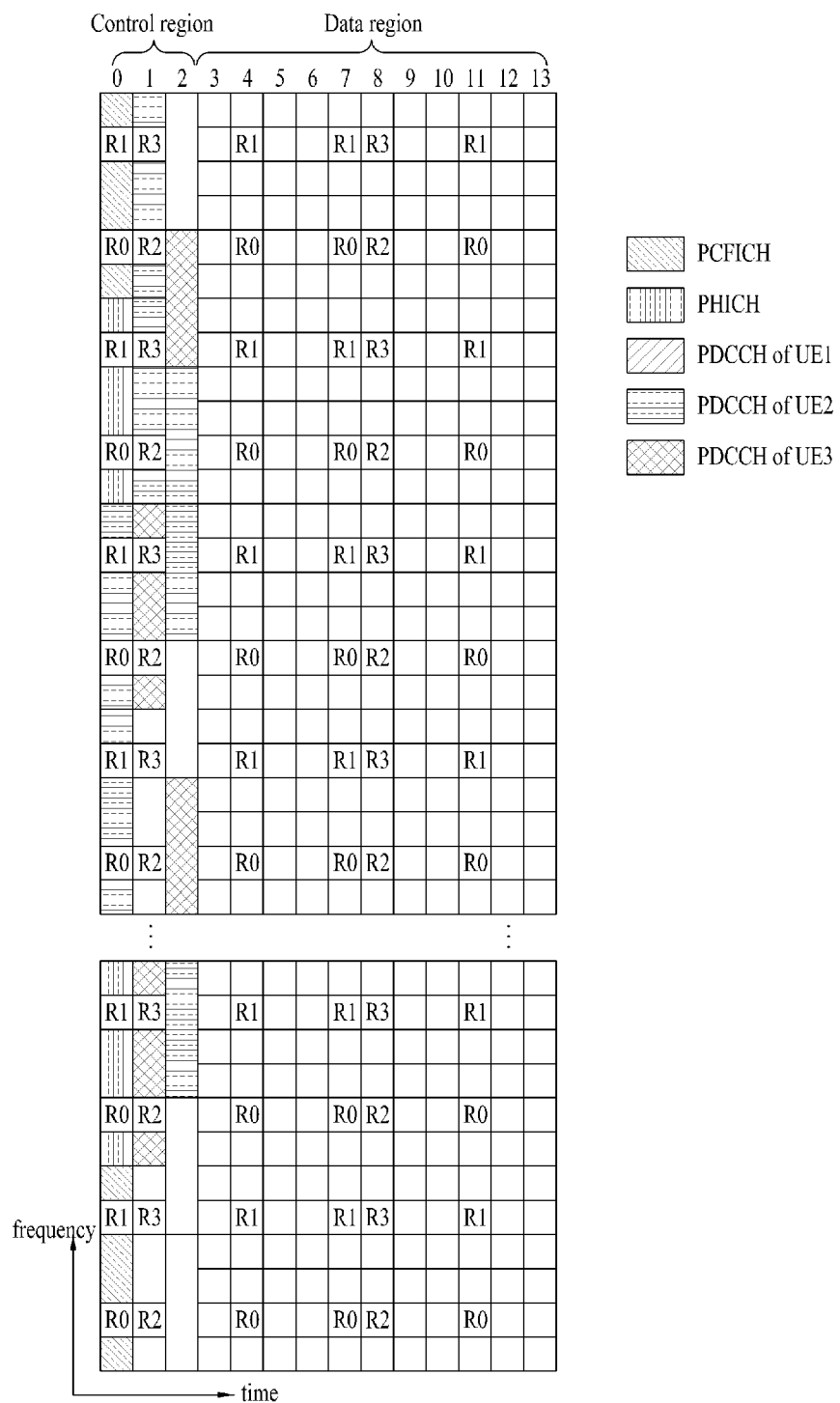
FIG. 5 is a diagram for one example of a structure of a downlink (DL) subframe used by LTE system.

FIG. 5 is a diagram for one example of a control channel included in a control region of a single subframe in a downlink (DL) radio frame.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

In the following description, reference signals are explained in detail. First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a base station, i.e., a UE-specific reference signal, and a common reference signal (common RS or CRS) for all user equipments.

FIG. 6 is a diagram for structures of a reference signal in LTE system supportive of a downlink transmission using 4 antennas. Particularly, FIG. 6 (a) shows a case of a normal cyclic prefix and FIG. 6 (b) shows a case of an extended cyclic prefix.

Referring to FIG. 6, numerals 0 to 3 entered in a grid correspond to antenna ports 0 to 3 and mean a common reference signal (CRS) that is a cell-specific reference signal transmitted for channel measurement and data demodulation. The cell-specific reference signal CRS can be transmitted to a user equipment across a control information region overall as well as across a data information region.

'D' entered in the grid means a downlink DM-RS (demodulation-RS) that is a UE-specific RS. The DM-RS supports a single antenna port transmission on PDSCH. A user equipment receives a signaling of a presence or non-presence of DM-RS, which is a UE-specific RS, through an upper layer. Downlink DM-RS is described in detail as follows.

When a base station transmits downlink (DL) data to a user equipment, it is able to transmit a DL DM-RS for channel estimation between the user equipment and the base station. As mentioned in the foregoing description, the base station transmits a DL DM-RS as a UE-specific reference signal and the corresponding reference signal is generated using a pseudo-random sequence c(n).

$$r_{n_s}(m) = \frac{1}{\sqrt{2}}(1 - 2 \cdot c(2m)) + j\frac{1}{\sqrt{2}}(1 - 2 \cdot c(2m+1)),$$ [Formula 8]

$$m = 0, 1, \ldots, 12N_{RB}^{PDSCH} - 1$$

$$c(n) = (x_1(n + N_C) + x_2(n + N_C)) \bmod 2$$ [Formula 9]

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

In Formula 9, $N_c$ is 1600 and a $1^{st}$ m-sequence has an initial value of $x_1(0)$ set to 1 and $x_1(n)$ set to 0 (yet, n is 1~30). An initial value of a $2^{nd}$ m-sequence is defined as $c_{init} = \Sigma_{i=0}^{30} x_2(i) \cdot 2^i$ and its value may be determined in accordance with a usage of the corresponding sequence.

A reference signal sequence of Formula 8 may be applicable to a single-cell single-user MIMO transmission, a single-cell multi-user MIMO transmission, a multi-cell single-user MIMO transmission and a multi-cell multi-user MIMO transmission all.

In MIMO transmission mode, the initial value $c_{init}$ of the $2^{nd}$ m-sequence used for the pseudo-random sequence generation in Formula 9 can be separately defined. In particular, the $c_{init}$ is characterized in further including a scramble discriminating parameter $N_{DRS}$ as a factor.

In this case, if a cell-specific reference signal and a DM-RS co-exist in the same OFDM symbol, the $N_{DRS}$ may be set to a value of 1. Otherwise, the $N_{DRS}$ may be set to a value of 0. And, the $N_{DRS}$ may be separately signaled from a base station through DCI format 2B received on PDCCH. Moreover, the $N_{ID}^{cell}$ may mean a cell ID or a group ID of a user group in a multi-cell multi-user MIMO mode.

Finally, regarding $n_{RNTI}$, SPS-RNTI may be used for semi-persistent transmission or C-RNTI may be usable for a non-semi-persistent transmission. Yet, the $n_{RNTI}$ may be set to 0 in accordance with a multiplexing scheme of DM-RS.

In LTE system, when there are 2 antenna ports for DM-RS transmission, if a multiplexing scheme is a frequency division multiplexing, $c_{init}$ may be defined as Formula 10.

$$c_{init} = N_{DRS} 2^{30} + (\lfloor n_s/2 \rfloor + 1) \cdot 2^{16} + n_{RNTI} \quad \text{[Formula 10]}$$

Moreover, regarding the $c_{init}$ for supporting a single-cell multi-user MIMO mode transmission, if a multiplexing scheme for an antenna port is a frequency division multiplexing, the $n_{RNTI}$ may be set to 0 to define the $c_{init}$ as one of Formulas 11 to 13 as follows.

$$c_{init} = N_{DRS} 2^{30} + (\lfloor n_s/2 \rfloor + 1) \cdot (2N_{ID}^{cell} + 1) \cdot 2^{16} \quad \text{[Formula 11]}$$

$$c_{init} = N_{DRS} 2^{14} + (\lfloor n_s/2 \rfloor + 1) \cdot (2N_{ID}^{cell} + 1) \cdot \quad \text{[Formula 12]}$$

$$c_{init} = N_{DRS} + (\lfloor n_s/2 \rfloor + 1) \cdot (2N_{ID}^{cell} + 1) \cdot 2^{16} \quad \text{[Formula 13]}$$

Moreover, parameters (e.g., cyclic shift value, rank information, etc.) for the base station to transmit the DL DM-RS are signaled through a DL control information transmitted on PDCCH.

In the current wireless communication environments, the data demand for a cellular network is rapidly increasing due to the M2M (machine-to-machine) communications and the prevalent use of various devices that requires high data throughput. In order to meet the high data demand, the communication technology is evolving into a carrier aggregation technology for using more frequency bands efficiently, a multi-antenna (MIMO) technology for increasing data capacity in limited frequencies, a multiple base station cooperation technology and the like and the communication environment is evolving in a direction for raising density of accessible nodes around a user. A system provided with such nodes in high density can show higher system performance by cooperation among the nodes. According to this system, the nodes operates as independent base station (e.g., a base station (BS), an advances BS (ABS), a Node-B (NB), an eNode-B (eNB), an access point (AP), etc.) to have performance better that in case of not cooperating with each other.

Figure 7:
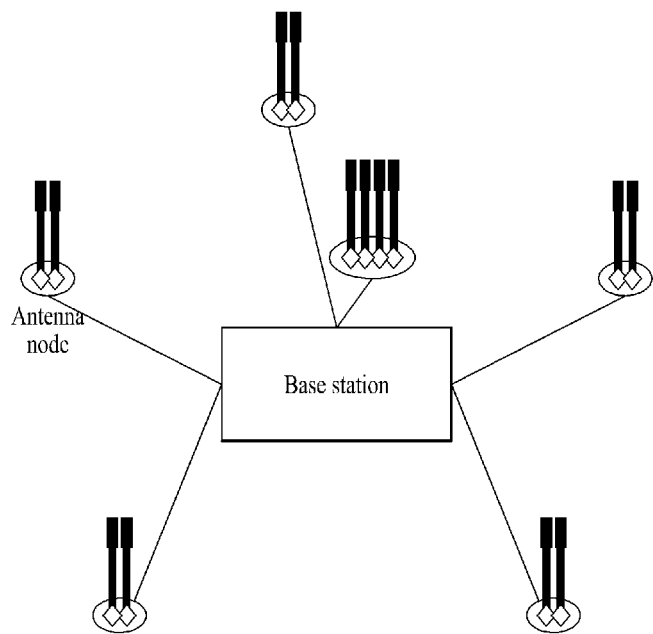
FIG. 7 is a diagram for one example of a multi-node system in a next generation communication system.

FIG. 7 is a diagram for one example of a multi-node system in a next generation communication system.

Referring to FIG. 7, as transmission and receptions of all nodes are managed by a single controller, if each individual node operates a partial antenna group of a single cell, this system can be regarded as a distributed multi-node system (DMNS) that configures a single cell. In this case, each of the individual nodes can receive a separate Node ID and may be able to operate as a partial antenna in a cell without the separate Node ID. Yet, if nodes have different cell identifiers (IDs), such a system can be regarded as a multi-cell system. If these multiple cells are configured in a manner of overlapping each other depending on a coverage, such a configuration can be called a multi-tier network.

Meanwhile, Node-B, eNode-B, PeNB, HeNB, RRH (remote radio head), relay, a distributed antenna and the like can become nodes and at least one antenna is installed on a single node. A node may be called a transmission point. A node generally means an antenna group distant in a predetermined interval or more. Yet, according to the present invention, even if a node is defined as a random antenna group irrespective of an interval, it is applicable to the present invention.

Owing to the introduction of the above-mentioned multi-node system and the above-mentioned relay node, various communication schemes are applicable to channel quality enhancement. Yet, in order to apply the aforementioned MIMO scheme and the inter-cell cooperative communication scheme to the multi-node environment, the introduction of a new control channel is necessary. For this necessity, a control channel discussed for a new introduction is E-PDCCH (Enhanced-PDCCH). And, it has been determined that the 3-PDCCH shall be assigned not to an existing control region (hereinafter named a PDCCH region) but to a data region (hereinafter named a PDSCH region).

Therefore, since transmission of control information for a node becomes possible for each user equipment through the E-PDCCH, it is also able to solve the problem that an existing PDCCH region may become insufficient. For reference, E-PDCCH is not provided not to an existing legacy user equipment but can be received by an LTE-A user equipment only.

Figure 8:
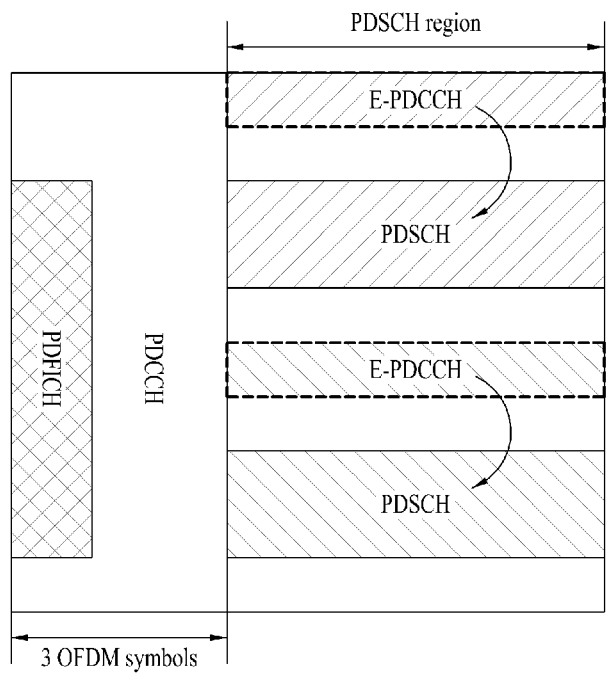
FIG. 8 is a diagram for one example of PDSCH scheduled by E-PDCCH and E-PDCCH.

FIG. 8 is a diagram for one example of PDSCH scheduled by E-PDCCH and E-PDCCH.

Referring to FIG. 8, E-PDCCH can define and use a portion of a PDSCH region for transmitting data in general. And, a user equipment should perform a blind decoding process for detecting a presence or non-presence of E-PDCCH of its own. The E-PDCCH performs the same scheduling operations (i.e., PDSCH control, PUSCH control, etc.) of an existing PDCCH. Yet, if the number of user equipments connected to such a node as RRH increases, more E-PDCCHs are assigned to a PRSCH region to raise the number of blind decodings that should be performed by a user equipment. Hence, the E-PDCCH may have a disadvantage in that complexity increases.

In the following description, in a wireless communication system of a TDD type, a transmission mode $^{TM}$ is described. In the wireless communication system of the TDD type, the transmission mode is configured by an upper layer in order for a user equipment to decode a received PDCCH with a CRC.

TABLE 1

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |

TABLE 1-continued

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one Single-antenna port, port 0 is used (see subclause 7.1.1), otherwise Transmit diversity (see subclause 7.1.2) MBSFN subframe: Single-antenna port, port 7 (see subclause 7.1.1) |
|  | DCI format 2C | UE specific by C-RNTI | Up to 8 layer transmission, ports 7-14 (see subclause 7.1.5B) or single-antenna port, port 7 or 8 (see subclause 7.1.1) |

A user equipment decodes PDCCH and PDSCH corresponding to the PDCCH in accordance with the combination defined in Table 1. In particular, in accordance with a detected DCI format, the user equipment sets up a search space and then performs a decoding in a manner of differentiating a transmission scheme of PDSCH. For instance, in case that a user equipment set to a transmission mode 3, 4, 8 or 9 detects a DCI corresponding to format 1A, a PDSCH transmission may assume that a transport block 1 and a transport block 2 are activated and deactivated, respectively.

In the following description, a transmission scheme of a user equipment in transmission mode 8 (TM8) and a transmission scheme of a user equipment in transmission mode 9 (TM9) among PDCCH and PDSCH transmission schemes of a user equipment are explained in detail.

In case of the transmission mode 8, a detected DCI format can be categorized into DCI format 1A or DCI format 2B. If the DCI detected by the user equipment is the DCI format 1A, a search space can be set to a common search space and a UE specific search space in accordance with C-RNTI (cell-radio network temporary identifier). Moreover, if the number of PBCH (physical broadcast channel) antenna port(s) is 1 (i.e., in case of a single antenna port), the PDSCH transmission scheme uses port #0. Otherwise, a transmit diversity scheme is used. If a format of DCI detected by a user equipment is 2B, a search space is set to a UE specific search space in accordance with C-RNTI (cell-radio network temporary identifier). Moreover, a user equipment is set to use a dual layer transmission scheme using antenna port #7 and antenna port #8 or a single antenna port transmission scheme using the antenna port #7 or the antenna port #8.

In case of a user equipment set to a transmission mode 9, a detected DCI formats can be categorized into DCI format 1A or DCI format 2B. If the DCI detected by the user equipment is the DCI format 1A, a search space can be set to a common search space and a UE specific search space in accordance with C-RNTI (cell-radio network temporary identifier). If the user equipment set to the transmission mode 9 has the DCI format 1A, a PDSCH transmission scheme is set differently depending on a presence or non-presence of MBSFN (multimedia broadcast single frequency network). In case of the presence of the MBSFN subframe, when the number of PBCH (physical broadcast channel) antenna port(s) is 1 (i.e., in case of a single antenna port), the PDSCH transmission scheme is set to use port #0. Otherwise, the PDSCH transmission scheme is set to use a transmit diversity scheme. In case of the non-presence of the MBSFN subframe, the PDSCH transmission scheme is set to use antenna port #7 as a single antenna port.

If a format of DCI detected by a user equipment (set to the transmission mode 9) is 2C, a search space is set to a UE specific search space in accordance with C-RNTI (cell-radio network temporary identifier). In this case, the PDSCH transmission scheme is set to use maximum 8 layers corresponding to antenna ports #7 to #14 or a single antenna port using the antenna port #7 or the antenna port #8.

PRB bundling is described as follows.

First of all, PRB bundling means that a user equipment set to transmission mode 9 assumes a plurality of resource blocks in frequency domain as a single granularity for precoding in order to perform PMI/RI reporting.

System bandwidth is divided into fixed system bandwidth in accordance with size P' of Precoding Resource Block Groups (PRGs). And, each of the PRGs is configured with contiguous PRBs. If $N_{RB}^{DL}$ mod P'>0, a size of one of the precoding resource block groups (PRGs) is $N_{RB}^{DL} - P'\lfloor N_{RB}^{DL}/P' \rfloor$.

A size of PRG assumed by a user equipment in LTE system is described in detail with reference to Table 2 as follows. In LTE system, a PRB size assumed for a given system bandwidth by a user equipment is defined as table 2 in the following.

TABLE 2

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

For instance, if a bandwidth $N_{RB}^{DL}$ of a downlink is set to 25, a size of PRG is defined as '2' in Table 2. Hence, one of PRGs in PRB bundling is configured with 1 PRB. In particular, a system bandwidth is divided into total 13 PRGs consisting of 12 PRGs, each of which is constructed with 2 PRBs, and 1 PRG constructed with 1 PRB. In this case, a user equipment (UE) can assume that the same precoder can be applied to all scheduled PRBs belonging to a single PRG.

According to the present invention, if the number of transmission layers (or rank) of E-PDCCH is equal to the number of transmission layers of PDSCH, a user equipment (UE) performs DM-RS based channel estimation through PRB bundling.

1st Embodiment

According to a 1st embodiment of the present invention, if the number of transmission layers (or rank) of E-PDCCH is equal to the number of transmission layers of PDSCH, a user equipment (UE) is proposed to perform DM-RS based channel estimation through PRB bundling.

Figure 9:
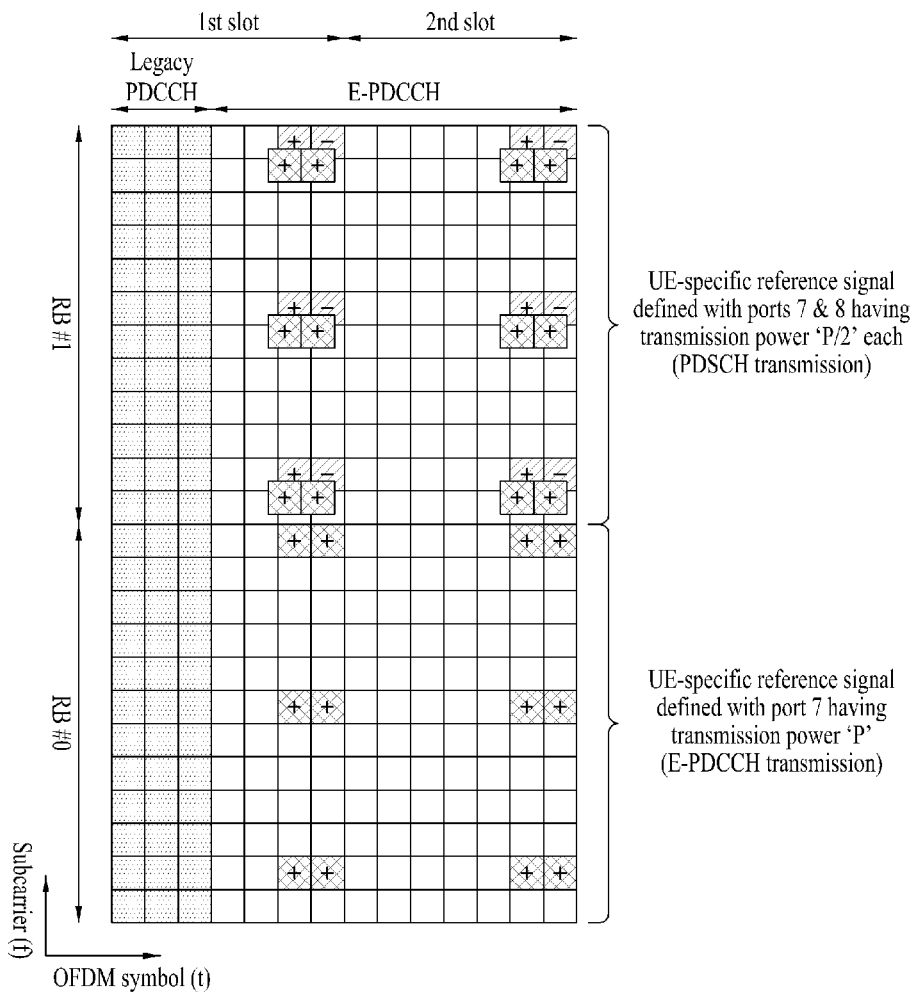
FIG. 9 is a diagram for one example of a transmission power depending on the layer number of E-PDCCH and the layer number of PDSCH.

FIG. 9 is a diagram for one example of a transmission power depending on the layer number of E-PDCCH and the layer number of PDSCH. In order to perform PRB bundling, it is preferable to consider a transmission power distribution depending on the number of layers of E-PDCCH and the number of layers of PDSCH. If a DM-RS based E-PDCCH transmission power is different from a PDSCH transmission power, although the same antenna port is used, it is unable to perform a bundling due to a reception power difference.

For instance, assume that a transmission is performed with a transmission power 'P' using a single layer corresponding to E-PDCCH antenna port #7 on RB #0. In this case, if PDSCH scheduled to correspond to E-PDCCH is transmitted using two layers, it is unable to perform a bundling due to a reception power difference despite that DM-RS uses the same port. In particular, since EPRE (energy per RE) of E-PDCCH and EPRE of PDSCH should be considered identically, in case that the PDSCH is transmitted using two layers of antenna ports #7 and #8 with a power 'P/2' each, although the PDSCH and the E-PDCCH use the same port (e.g., port #7), it is unable to perform a bundling due to the transmission power difference.

In order to solve the above-mentioned problem, a 1st embodiment of the present invention proposes the following schemes.

1) A scheme is proposed as follows. First of all, if a DCI obtained from detecting E-PDCCH by a user equipment (set to a transmission mode 9) is format 2C, E-PDCCH transport PRB and PDSCH transport PRBs are RPB-bundled through interpretation of the detected DCI. In particular, when a detected DCI is format 2C (TM9), if the layer number of a scheduled PDSCH is equal to the layer number of E-PDCCH as a result of interpreting an indication field, a channel estimation through PRB bundling is performed.

Figure 10:
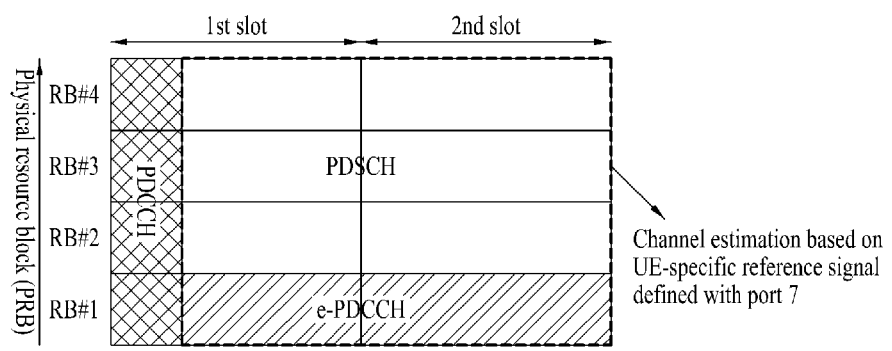
FIG. 10 is a diagram to describe the bundling of E-PDCCH PRB and PDSCH PRB according to one embodiment of the present invention.

FIG. 10 is a diagram to describe the bundling of E-PDCCH PRB and PDSCH PRB according to a 1st embodiment of the present invention.

Referring to FIG. 10, a user equipment (UE) can be aware of the layer number of a scheduled PDSCH through interpretation of antenna port(s), scrambling ID (identity) and layer number (number of layers) included in a detected DCI. Interpretation of an indication field configured with 3 bits of DCI format 2C is defined in Table 3.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

For instance, if a value of an indication field of DCI configured with 3 bits is 1, a user equipment can be aware of information indicating that the layer number of a scheduled PDSCH is 1 and that the PDSCH is transmitted using antenna port #7.

Hence, if the layer number of E-PDCCH is 1 and an antenna port for the E-PDCCH is identical to the antenna port for the PDSCH, the user equipment (UE) performs a bundling between PRB of the E-PDCCH and PRB of the PDSCH. For instance, as shown in FIG. 9, if E-PDCCH is transmitted using antenna port #7 and PDSCH scheduled through the E-PDCCH is transmitted using the antenna port #7 only, PRB bundling is performed.

Yet, if E-PDCCH is transmitted using antenna port #7 and PDSCH is transmitted using antenna ports {#7, #8}, as shown in FIG. 9, a user equipment (UE) is unable to use DM-RS, which was previously used for the E-PDCCH transmission, for channel estimation of the PDSCH. The reason for this is that bundling cannot be performed due to a transmission power difference despite that the DM-RS is transmitted using the same port (i.e., antenna port #7).

2) A scheme is proposed as follows. First of all, if a DCI obtained from detecting E-PDCCH by a user equipment (set to a transmission mode 8) is format 2B, E-PDCCH transport PRB and PDSCH transport PRBs are RPB-bundled through interpretation of the detected DCI. In particular, when a detected DCI is format 2B (TM8), a transmission is possible using maximum 2 layers in accordance with dual layer beamforming. Hence, if the layer number of PDSCH and the layer number of E-PDCCH are equal to each other as a result of interpretation of the number of transport blocks, channel estimation is performed through PRB bundling.

According to a 2nd embodiment of the present invention, in case that a detected DCI is format 2B (TM8), since a transmission is possible using maximum 2 layers, it is able to obtain a transmission layer and a used antenna port though interpretation of the number of transmitted transport blocks.

If the number of the transmitted transport blocks is 2, it is able to obtain that a user equipment (UE) has 2 layers and uses antenna port #7 and antenna port #8. Hence, in this case, PRB bundling is possible only if E-PDCCH is transmitted using 2 layers and all UE reference signals (DM-RS) can be used for channel estimation.

Yet, if the number of the transmitted transport block is 1, a transmission is performed using one of the antenna port #7 and the antenna port #8 only. Hence, a user equipment (UE) is able to obtain information on antenna port for PDSCH transmission using an indication field of a disabled transport block. For instance, it is able to obtain information on antenna port through interpretation of NDI (new data indicator) contained in a disabled transport block according to DCI format 2B.

TABLE 4

| New data indicator of the disabled transport block | Antenna port |
|---|---|
| 0 | 7 |
| 1 | 8 |

In particular, referring to Table 4, a single transport block can be transmitted using antenna port #7 or antenna port #8. And, a user equipment (UE) can obtain the following information from interpreting NDI (new data indicator) of a disabled transport block. First of all, if the NDI indicates 0, an antenna port for PDSCH transmission is antenna port #7. Hence, if E-PDCCH is transmitted using 1 layer through antenna port #7, a user equipment (UE) can perform a PRB bundling. In doing so, E-PDCCH transmission power is equal to that of PDSCH.

Figure 11:
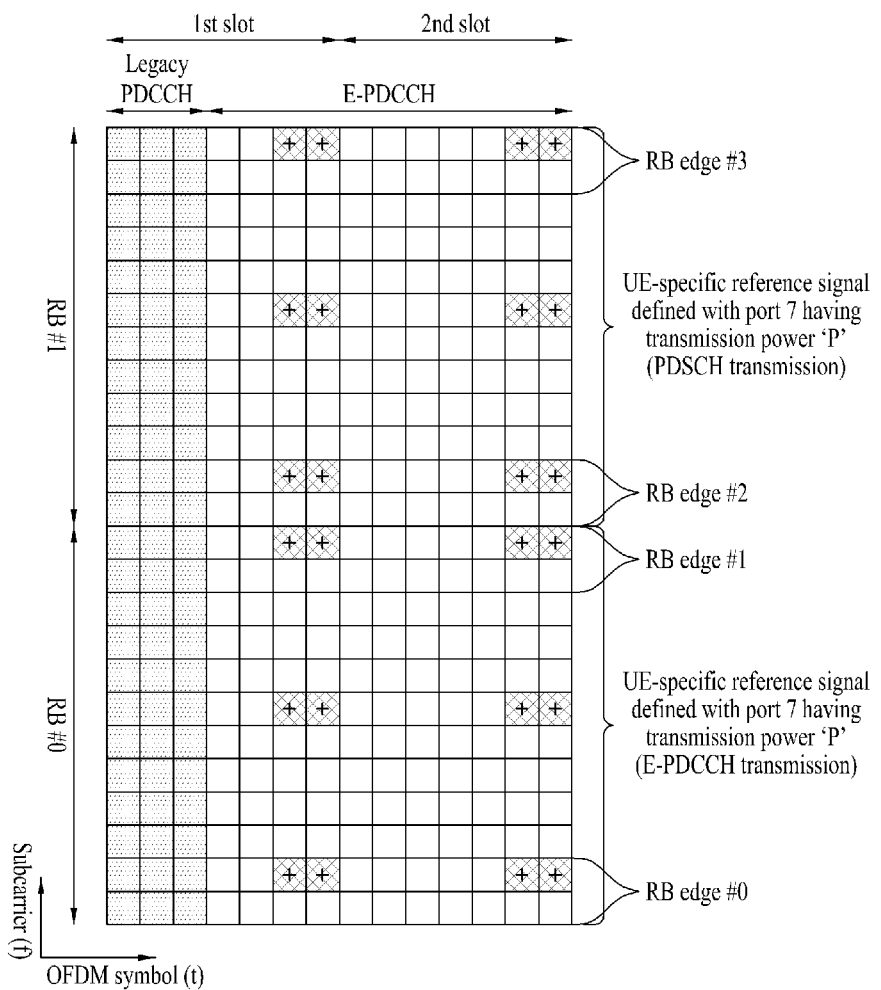
FIG. 11 is a diagram to describe the reduction of RB edge as a result of PRB bundling according to one embodiment of the present invention.

Effects according to ne embodiment of the present invention are described with reference to FIG. 11 as follows. First of all, assuming that PDCCH and PDSCH are transmitted using a single layer through antenna port #7, the same transmission power 'P' is used. And, RB #0 (for E-PDCCH) and RB #1 (for PDSCH) can be bundled together. In this case, an edge of the RB #0 is assumed as named RB edge #0 and RB edge #1. And, an edge of the RB #1 is assumed as named RB edge #2 and RB edge #3. Through PRB bundling of RB #0 and RB #1, the RB edge #1 and the RB edge #2 do not correspond to edge of RB anymore.

In particular, in case that PRB bundling is not performed, since channel estimation is generally performed using per-PRB DM-RS only, accuracy of channel estimation gets lower toward RB edge. On the contrary, according to one embodiment of the present invention, if PRB bundling is performed, as an edge part disappears as many as the number of bundled PRBs and an increased DM-RS granularity, the accuracy of channel estimation can be raised.

2$^{nd}$ Embodiment

According to a 2$^{nd}$ embodiment of the present invention, if the number of transmission layers (or rank) of E-PDCCH is different from the number of transmission layers of PDSCH, it is proposed to perform DM-RS based channel estimation by performing PRB bundling through reception power coordination. In particular, although a base station performs a transmission using a normal power, if a transmission power of E-PDCCH is different from that of PDSCH, a user equipment is able to perform a PRB bundling by coordinating a reception power.

Figure 12:
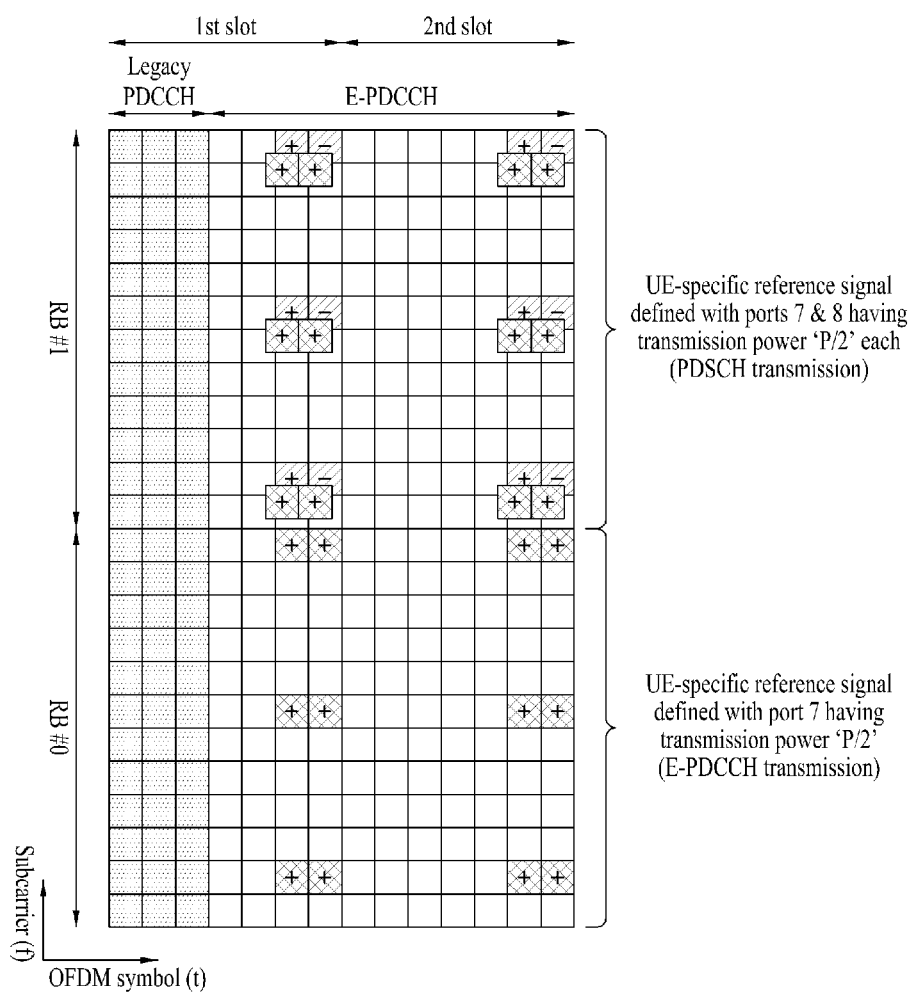
FIG. 12 is a diagram for example of a transmission power coordination of E-PDCCH PRB, if E-PDCCH PRB and PDSCH PRB differ from each other in reception power, according to one embodiment of the present invention.

Reception power coordination according to an embodiment of the present invention is described with reference to FIG. 12 as follows. For example, assume that E-PDCCH is transmitted using a single layer through antenna port #7. And, assume that a UE specific reference signal (DM-RS) is transmitted with a power 'P'. In this case, a PDSCH scheduled through the E-PDCCH is transmitted through antenna port #7 and antenna port #8, i.e., using two layers, a UE-specific reference signal (DM) will be transmitted with 'P/2' power each. Hence, a user equipment (UE) is able to perform a PRB bundling in a manner that a UE-specific reference signal (DM-RS) reception power of E-PDCCH transport PRB is coordinated into ½ to be equal to a reception power of the PDSCH.

Figure 13:
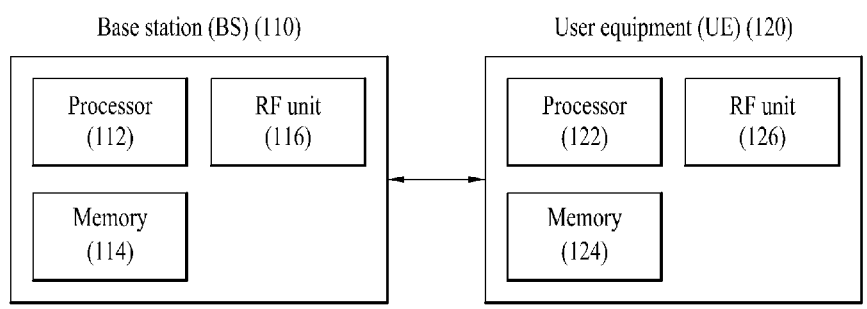
FIG. 13 is a block diagram for one example of a base station and a user equipment applicable to an embodiment of the present invention.

FIG. 13 illustrates a base station BS and a user equipment UE applicable to an embodiment of the present invention. If a relay is included in a wireless communication system, a communication in backhaul link is performed between a base station and a relay. And, a communication in access link is performed between a relay and a user equipment. Hence, the base station or user equipment shown in the drawing may be substituted with a relay in some cases.

Referring to FIG. 13, a wireless communication system includes a BS 110 and a UE 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of performing a channel estimation using both a UE-specific reference signal (DM-RS) for decoding of a control channel of a user equipment and a DM-RS for decoding of a corresponding data transport channel in a wireless communication system and apparatus therefor are described mainly with reference to examples applied to 3GPP LTE system, as mentioned in the foregoing description, the present invention is applicable to various kinds of wireless communication systems as well as to the 3GPP LTE system.

What is claimed is:

1. A method of estimating a downlink data channel, which is estimated by a user equipment in a wireless communication system, comprising the steps of:
   receiving a downlink control channel using a UE-specific reference signal;
   if a space resource for the downlink control channel is identical to a space resource for the downlink data channel indicated by the downlink control channel, bundling a resource block for the downlink data channel and a resource block for the downlink control channel with each other by a single channel estimation unit; and
   performing a channel estimation on the single channel estimation unit based on the UE-specific reference signal.

2. The method of claim 1, wherein the space resource is defined as at least one antenna port index for a specific user equipment and a layer number according to the antenna port.

3. The method of claim 2, wherein if the space resources are identical to each other, an antenna port index for the downlink control channel and a layer number are defined as identical to those for the downlink data channel.

4. The method of claim 1, wherein the downlink control channel includes an indication field defining the space resource of the downlink data channel and wherein the space resource of the downlink data channel is determined in accordance with the definition of the indication field.

5. The method of claim 1, wherein the downlink control channel includes information on a transport block for the downlink data channel and wherein the space resource of the downlink data channel is defined in accordance with the information on the transport block.

6. The method of claim 5, wherein if the information on the transport block includes information on a disabled transport block, the space resource for the downlink data channel is determined in accordance with an NDI (new data indicator) of the disabled transport block.

7. The method of claim 1, further comprising the steps of:
   if the number of space resources for the downlink data channel is greater than that of space resources for the downlink control channel, coordinating a reception power of the downlink control channel into a reception power corresponding to each of the space resources of the downlink data channel; and
   bundling the resource block for the downlink data channel and the resource block for the downlink control channel with each other by the single channel estimation unit.

8. In estimating a downlink data channel in a wireless communication system, a user equipment comprising:
   a radio frequency (RF) unit; and
   a processor receiving a downlink control channel using a UE-specific reference signal, the processor, if a space resource for the downlink control channel is identical to a space resource for the downlink data channel indicated by the downlink control channel, bundling a resource block for the downlink data channel and a resource block for the downlink control channel with each other by a single channel estimation unit, the processor configured to perform a channel estimation on the single channel estimation unit based on the UE-specific reference signal.

9. The user equipment of claim 8, wherein the space resource is defined as at least one antenna port index for a specific user equipment and a layer number according to the antenna port.

10. The user equipment of claim 9, wherein if the space resources are identical to each other, an antenna port index for the downlink control channel and a layer number are defined as identical to those for the downlink data channel.

11. The user equipment of claim 8, wherein the downlink control channel includes an indication field defining the space resource of the downlink data channel and wherein the controller is configured to determine the space resource of the downlink data channel in accordance with the definition of the indication field.

12. The user equipment of claim 8, wherein the downlink control channel includes information on a transport block for the downlink data channel and wherein the processor is configured to determine the space resource of the downlink data channel in accordance with the information on the transport block.

13. The user equipment of claim 8, wherein if the information on the transport block includes information on a disabled transport block, the processor is configured to determine the space resource for the downlink data channel in accordance with an NDI (new data indicator) of the disabled transport block.

14. The user equipment of claim 8, wherein if the number of space resources for the downlink data channel is greater than that of space resources for the downlink control channel, the processor coordinates a reception power of the downlink control channel into a reception power corresponding to each of the space resources of the downlink data channel and is further configured to bundle the resource block for the downlink data channel and the resource block for the downlink control channel with each other by the single channel estimation unit.

* * * * *